United States Patent

[11] 3,549,925

| [72] | Inventor | Horward R. Johnson |
| | | Ann Arbor, Mich. |
| [21] | Appl. No. | 796,818 |
| [22] | Filed | Feb. 5, 1969 |
| [45] | Patented | Dec. 22, 1970 |
| [73] | Assignee | Kelsey Hayes Company |
| | | Romulus, Mich. |
| | | a corporation of Delaware |

[54] ALTERNATING CURRENT GENERATOR
9 Claims, 6 Drawing Figs.

[52] U.S. Cl. .................................................. 310/168,
310/156, 310/257
[51] Int. Cl. ...................................................... H02k 19/24
[50] Field of Search .......................................... 310/168,
257, 156, 159, 166, 171, 181, 263

[56] References Cited
UNITED STATES PATENTS
| 1,338,568 | 4/1920 | Foote | 310/257 |
| 1,976,880 | 10/1934 | Graseby | 310/156 |
| 3,401,287 | 9/1968 | French | 310/168 |

FOREIGN PATENTS
| 1,186,319 | 8/1959 | France | 310/257 |
| 692,795 | 8/1965 | Italy | 310/257 |

Primary Examiner—Milton O. Hirshfield
Assistant Examiner—R. Skudy
Attorney—Harness, Dickey & Pierce ABSTRACT: A device utilizing a permanent magnet and providing an alternating current output by alternately reversing flux around an output coil and including a stator including the coil and having stator members with interdigitating fingers for defining magnetic paths around the coil with the rotor including a magnet structure with a plurality of north and south poles cooperating with the stator members so as to provide flux reversal around the coil.

PATENTED DEC22 1970

INVENTOR
Howard R. Johnson.
BY Harness, Dickey & Pierce
ATTORNEY

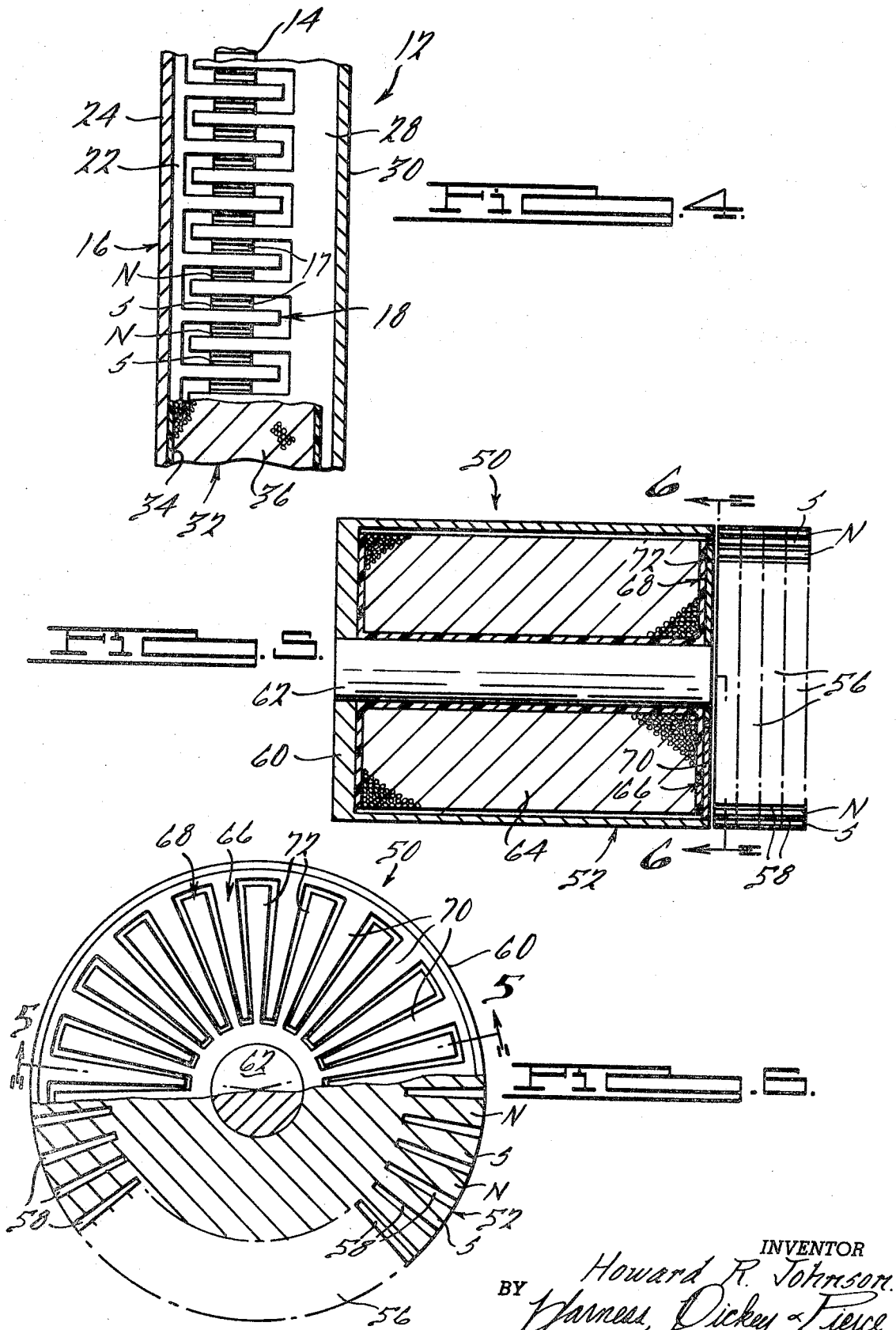

3,549,925

ALTERNATING CURRENT GENERATOR

SUMMARY BACKGROUND OF THE INVENTION

The present invention relates to electrical generating devices and more specifically to a device for generating an alternating current and further to an alternating current device for use as a rotational speed sensor In some skid control systems for automotive vehicles, sensors are used for sensing rotational speed of the vehicle wheels and providing an output signal having a frequency varying with the wheel speed; in such applications, it is desirable that the sensor have a relatively high output over the speed range of the wheel such that noise and transients will not be effective in the operation of the skid control system In the present invention, the sensor is constructed such that magnetic flux is alternately reversed around a sensing coil resulting in a relatively high AC output Therefore, it is an object of the present invention to provide an electrical sensor utilizing alternate flux reversals resulting in a high electrical output signal.

Because of the inherent nonlinearity of output potential relative to wheel speed, some skid control systems have been constructed to utilize frequency modulation where such nonlinearity will not effect the system; in the present invention a linear output of high amplitude is provided permitting the construction of a reliable skid control system utilizing amplitude modulation.

It is another object of the present invention to provide a novel structure for a sensor of the above described type It is another object to provide a novel AC generating device Other objects, features, and advantages of the present invention will become apparent from the subsequent description and the appended claims, taken in conjunction with the accompanying drawings, in which:

BRIEF DESCRIPTION OF THE DRAWINGS

FIG. 4 is a sectional view taken generally along the lines 4–4 in FIG. 1;

FIG. 5 is a longitudinal sectional view of a modified device taken generally along the lines 5–5 in FIG. 6; and FIG. 6 is a sectional view of the device of FIG. 5 taken generally along the lines 6–6.

Figure 1:
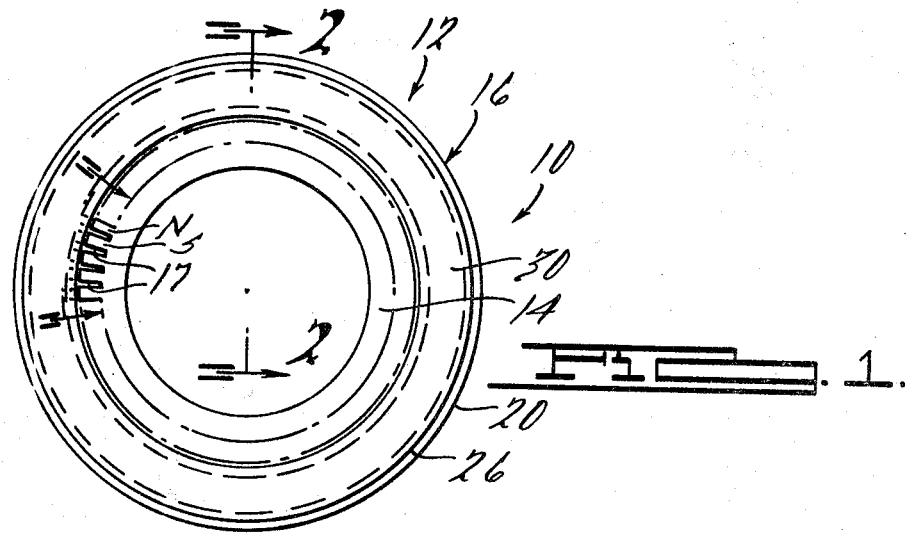
FIG. 1 is an end elevational view with some parts shown broken away and others in section, a device embodying features of the present invention.
Figure 2:
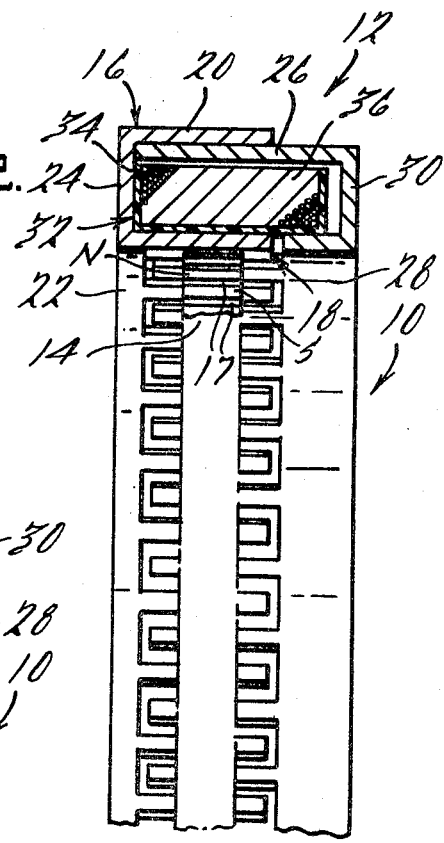
FIG. 2 is a sectional view of the device of FIG 1 taken generally along the lines 2–2.
Figure 3:
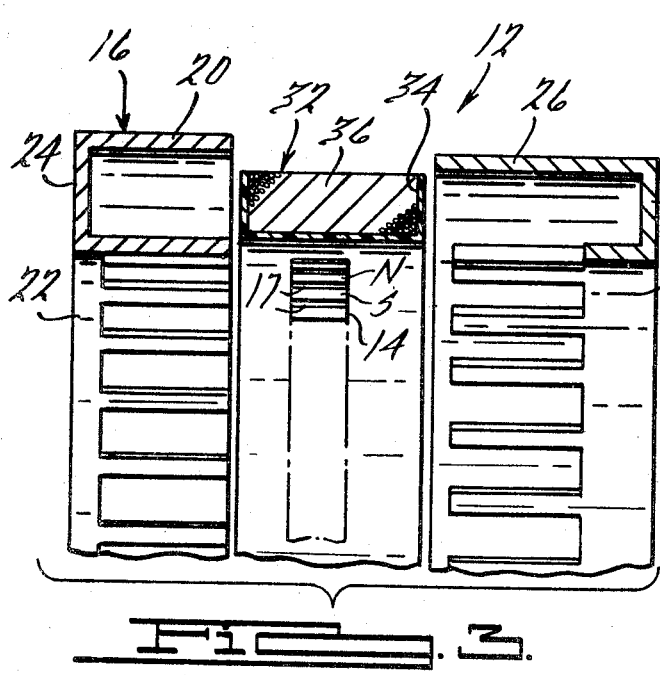
FIG. 3 is an exploded view depicting a portion of the device of FIGS. 1 and 2.

Looking now to the embodiment of FIGS. 1–4, a sensor assembly is generally indicated by the numeral 10 and includes a stator assembly 12 and a rotor 14. The rotor 14 is of an annular, ring-shaped construction made of a permanent magnet material and having a plurality of circumferentially alternating north and south poles (indicated by N and S) at its periphery. The poles are separated by axially extending slots 17. The rotor 14 can be supported upon a member to be rotated, i.e., in a skid control system rotor 14 would be mounted to rotate with a wheel. The rotor 14 can be made of a good magnetic material such as barium ferrite The stator assembly 12 includes a pair of axially interfitting cup-shaped stator members 16 and 18. The outer member 16 has a continuous outer annular flange 20 and a toothed, annular inner flange 22 which are connected by an annular radial portion 24. In a similar manner, the inner member 18 has a continuous outer, annular flange 26 and a toothed, annular inner flange 28 which are connected by an annular radial portion 30. The flange 26 is radially smaller than flange 20 and is dimensioned to fit snugly within and in intimate contact with flange 20; this provides means for holding the two stator members 16 and 18 together and also provides a common magnetic path which functions in a manner to be described The toothed inner flanges 22 and 28 are of the same radial size and are located such that the teeth of flange 22 alternate with the teeth of flange 28. As assembled, the stator members 16 and 18 define an annular cavity in which is located a coil assembly 32 The coil assembly 32 includes a plastic, cup-shaped bobbin 34 in which is wound a coil 36. The rotor 14 is located concentrically within the stator assembly 12. The poles (N-S) on the rotor 14 are spaced such that when the north poles are aligned with the teeth of one of the flanges 22, 28 the south poles are aligned with the teeth of the other flanges 22, 28. In this position, the flux will move from the magnetic north poles through the aligned fingers of one of the flanges 22, 28, through one of the portions 24, 30, through the outer flanges 20, 26, through the other of the portions 24, 30 and to the associated south poles. Thus, flex will travel in one direction around the coil 36. When the rotor 14 rotates the distance of one tooth on the flanges 22, 28 the orientation of the magnetic poles (N-S) relative to the fingers on the flange 22, 28 will be reversed resulting in the flux traveling in an opposite direction around the coil 36. This results in an output signal having both positive and negative excursions and hence provides for an output of a high amplitude. In addition, a relatively simple construction has been provided. The teeth of flange 22 and teeth of flange 28 are spaced from each other and separated by paths of high reluctance.

FIGS. 5—6 show a modified device generally indicated by the numeral 50 and including a stator assembly 52 and a rotor assembly 54. The rotor assembly 54 includes a plurality of flat discs 56 of permanent magnetic material, i.e., barium ferrite, which are provided with a plurality of circumferentially alternating north (N) and south (S) poles separated by a plurality of axially extending slots 58. The rotor assembly 54 is located coaxially with the stator assembly 52 and is adapted to be rotated relatively thereto The stator assembly 52 includes a hollow, cup-shaped member 60 open at one end and having an axially extending spindle 62 upon which is supported a coil assembly 64. The opposite end is closed by a pair of interfitting, toothed disc members 66 and 68 The disc 66 is secured to the outer end of member 60 and has a plurality of radially inwardly extending teeth 70 which terminate a selected distance from the spindle 62. The disc 68 is secured to the spindle 62 and has a plurality of radially, outwardly extending fingers 72 which are located between and spaced from fingers 70. As rotor assembly 54 is rotated, the north poles are first located in alignment with fingers 70 and then fingers 72 while the south poles are first located in alignment with fingers 72 and then 70. In the first position, flux travels around coil assembly 64 in one direction and in the next position, the direction of travel of flux is reversed. This results in the generation of an alternating output having positive and negative excursions. With a device 50, a relatively high output potential can be attained Both devices 10 and 50 have good output characteristics which are especially useful in skid control systems. In some prior skid control systems, wheel speed is determined by frequency modulation methods. With the sensors 10 and 50, the use of good magnet materials both in the rotor construction, i.e ceramic, grain oriented, permanent magnets capable of high coercive force, and in the stator parts comprising the magnetic paths, i.e., high Q magnetic materials, results in a device having a substantially linear output, i.e., linear relationship between variations in amplitude of output voltage versus variations in speed, such that a reliable skid control system utilizing amplitude modulation sn sensing can be constructed. Of course, the sensors 10 and 50 of the present invention could be used for either f-m or a-m operative skid control systems.

While it will be apparent that the preferred embodiments of the invention disclosed are well calculated to fulfill the objects above stated, it will be appreciated that the invention is susceptible to modification, variation and change without departing from the proper scope or fair meaning of the invention.

I claim:

1. An AC generating device comprising: a stator including an output coil, and a rotor including a permanent magnet having a plurality of circumferentially distributed north and south poles, said stator including magnetic circuit means operatively associated with said magnet for conducting the magnetic flux from said north and south poles first in one direction and then in the opposite direction around said coil as said magnet is rotated relatively to said coil and said circuit means, said circuit means comprising first and second pluralities of teeth located proximate each other with the teeth of said first plurality alternating with the teeth of said second plurality and spaced from each other at their locations of proximity by a high reluctance path and further comprising a member having a low reluctance path extending around said coil and magnetically connecting said first and second pluralities of fingers together, the fingers of said first plurality being in line with one polarity of said poles when the fingers of said second plurality are in line with the other polarity of said poles and vice versa whereby the flux around said coil is reversed as the relative rotation occurs resulting in an alternating output potential from said coil, said magnetic circuit means including a hollow, annular support member having said first and second pluralities of teeth located at one extremity with said coil being supported within said support member, said one extremity being one radial periphery of said support member, said first and second pluralities of teeth being located about a common circumference, said support member being constructed of a pair of interfitting, cup-shaped members with each cup-shaped member including one of said first and second pluralities of teeth at one circumference and with the teeth of said first and second pluralities extending axially, said magnet having a plurality of circumferentially disposed north and south magnetic poles located proximate to and concentrically with said first and second pluralities of teeth.

2. The device of claim 1 for use as a speed sensor in a skid control system and with said magnet being of a grain oriented ceramic material having a high coercive force and with said magnetic circuit means being of a high Q magnetic material whereby a substantially linear output potential can be obtained at said coil over a wide speed range.

3. An AC generating device comprising: a stator including an output coil, and a rotor including a permanent magnet having a plurality of circumferentially distributed north and south poles, said stator including magnetic circuit means operatively associated with said magnet for conducting the magnetic flux from said north and south poles first in one direction and then in the opposite direction around said coil as said magnet is rotated relatively to said coil and said circuit means, said circuit means comprising first and second pluralities of teeth located proximate each other with the teeth of said first plurality alternating with the teeth of said second plurality and spaced from each other at their locations of proximity by a high reluctance path and further comprising a member having a low reluctance path extending around said coil and magnetically connecting said first and second pluralities of fingers together, the fingers of said first plurality being in line with one polarity of said poles when the fingers of said second plurality are in line with the other polarity of said poles and vice versa whereby the flux around said coil is reversed as the relative rotation occurs resulting in an alternating output potential from said coil, said magnetic circuit means including a hollow, annular support member having said first and second pluralities of teeth located at one extremity with said coil being supported within said support member, said one extremity being one axial end of said support member.

4. The device of claim 3 with the teeth of said first and second pluralities extending radially.

5. The device of claim 4 with said support member including a cup-shaped cylinder and a spindle extending coaxially relative to said cylinder with said coil being supported in said cylinder on said spindle.

6. The device of claim 5 with said support member including a first toothed portion fixed to the open end of said cylinder and having said first plurality of teeth extending radially inwardly, a second toothed portion fixed to said spindle and having said second plurality of teeth extending radially outwardly.

7. The device of claim 6 with said first and second pluralities of teeth being coplanar.

8. The device of claim 3 with said magnet having a plurality of circumferentially disposed north and south magnetic poles located proximate to and axially in line with said first and second pluralities of teeth.

9. An AC generating device comprising: a stator including an output coil, and a rotor including a permanent magnet having a plurality of circumferentially distributed north and south poles, said stator including magnetic circuit means operatively associated with said magnet for conducting the magnetic flux from said north and south poles first in one direction and then in the opposite direction around said coil as said magnet is rotated relatively to said coil and said circuit means, said circuit means comprising first and second pluralities of teeth located proximate each other with the teeth of said first plurality alternating with the teeth of said second plurality and spaced from each other at their locations of proximity by a high reluctance path and further comprising a member having a low reluctance path extending around said coil and magnetically connecting said first and second pluralities of fingers together, the fingers of said first plurality being in line with one polarity of said poles when the fingers of said second plurality are in line with the other polarity of said poles and vice versa whereby the flux around said coil is reversed as the relative rotation occurs resulting in an alternating output potential from said coil, a speed sensor in a skid control system and with said magnet being of a grain oriented ceramic material having a high coercive force and with said magnetic circuit means being of a high Q magnetic material whereby a substantially linear output potential can be obtained at said coil over a wide speed range.